United States Patent [19]

Nishiba

[11] 3,750,077

[45] July 31, 1973

[54] CONTACTLESS SWITCHING APPARATUS

[75] Inventor: Seishiro Nishiba, Tokyo, Japan

[73] Assignee: Denki Onkyo Co., Ltd., Ohtaku, Tokyo, Japan

[22] Filed: Sept. 25, 1972

[21] Appl. No.: 291,599

[30] Foreign Application Priority Data

Sept. 23, 1971 Japan .............................. 46/87232

[52] U.S. Cl. ............. 338/32 R, 323/94 H, 335/205, 340/365 L

[51] Int. Cl. .............................................. H01c 7/16

[58] Field of Search ........................ 338/32 H, 32 R; 335/205-207; 340/365 L; 323/94 H; 324/45, 46

[56] References Cited

UNITED STATES PATENTS 3,571,774 3/1971 Hubrich .......................... 338/32 R 3,668,596 6/1972 Hubrich .......................... 338/32 R 3,673,537 6/1972 Greger ............................ 338/32 R

*Primary Examiner*—C. L. Albritton

*Attorney*—James E. Armstrong, John H. Harman et al.

[57] ABSTRACT

A contactless switching apparatus which is adapted to provide a switching output with variation of the magnetic flux being applied to a magnetro-resistance effect device provided in the closed magnetic path formed by a magnet and U-shaped yoke due to shift of said magnetic path when a key top is depressed, wherein a U-shaped yoke and terminal pins are fixed on a base, the magnet being connected to the key top is provided between free-ended segments of said U-shaped yoke, said U-shaped yoke, terminal pins and magnet are housed in a switch case and said magnet is slid along guideways provided on the inside surface of the switch case and is returned by a spring member.

13 Claims, 16 Drawing Figures

CONTACTLESS SWITCHING APPARATUS

BACKGROUND OF THE INVENTION

The present invention relates to a contactless switching apparatus adapted to be employed in a keyboard of an electronic computer or a desk type computer.

Generally, most of keyboards of computers are respectively designed to be equipped with a series of switch units in arrangement which are capable of providing corresponding signals. Therefore, the switch units are required to be produced at low costs.

The present invention provides a low-priced switching apparatus with a simplified construction.

SUMMARY

The present invention provides a contactless switching apparatus comprising a fixed yoke which is formed in U-shape with a magnetic material having a pair of parallel free-ended segments, a base made of non-magnetic material which secures said fixed yoke so that said both free-ended segments face upward, at least one magnetro-resistance effect device which is fixed to a side opposing to the other free-ended segment of one of free-ended segments of said fixed yoke, at least one terminal pin made of a conductive material which is provided near the free-ended segment on which said magnetro-resistance effect device is fixed and is fixed on the base, through which the lower end of the terminal pin is projected, with the loads of said magnetro-resistance effect device connected, a magnet which is arranged between said both free-ended segments so that both magnetic poles are positioned to oppose to said both free-ended segments and a magnetic path is formed between the magnetic poles and the free-ended segments of the fixed yoke, a support member which supports and is vertically movable, a switch case which is open at its lower side to cover said base, houses said fixed yoke, terminal pin and magnet, and is provided with a through hole at its upper surface through which said support member vertically slides and guideways which guide said support member in a vertical direction while controlling movement of said support member, a key top which is mounted on the upper part of said switch case, coupled to the upper end of the support member and is designed so that it can be lowered by manual depression and a spring member which provides resilient force to return said key top to the home position.

BRIEF DESCRIPTION OF DRAWINGS

The present invention is illustrated in detail by the accompanying drawings whereon:

FIG. 6*a* is a bottom view and FIG. 6*b* is a cross sectional view as seen along line X—X in FIG. 6*a*, FIG. 9*a* is a cutaway plan view, FIG. 9*b* is a cross sectional view as seen along line Y—Y in FIG. 9*a* and FIG. 9*c* is a cross sectional view as seen along line Z—Z in FIG. 9*a*.

DETAILED DESCRIPTION OF THE INVENTION

Figure 1:
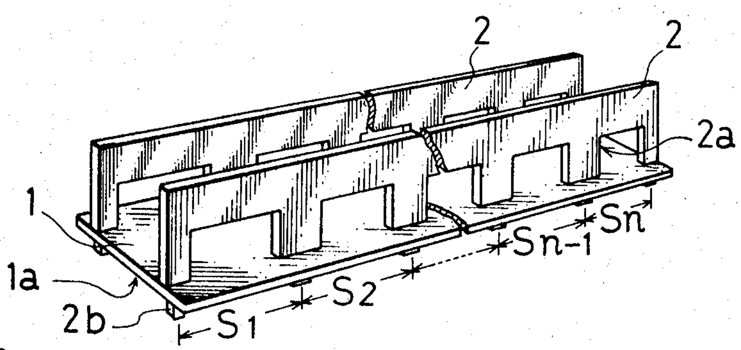
FIG. 1 is a front view showing the base plate and holding member to be employed in the switching apparatus according to the present invention.

Referring to FIG. 1, there is shown base plate 1 and holding member 2 adapted to be employed in the present invention.

Base plate 1 is provided with printed circuit 1*a* at its rear surface and a pair of plate-type holding members 2 are provided in parallel with a certain specified distance on the base plate. This holding member is designed to have a number of many unit portions $S_1$, $S_2$, - - - , $S_n$ which are repeated in the same shape along the lengthwise direction. Each of said unit portions is provided recessed opening 2*a* which is open downwardly and projection 2*b* which is projected downwardly. Holding member 2 is fixed to base plate 1 by soldering said projection to printed circuit 1a through base plate 1.

Figure 2:
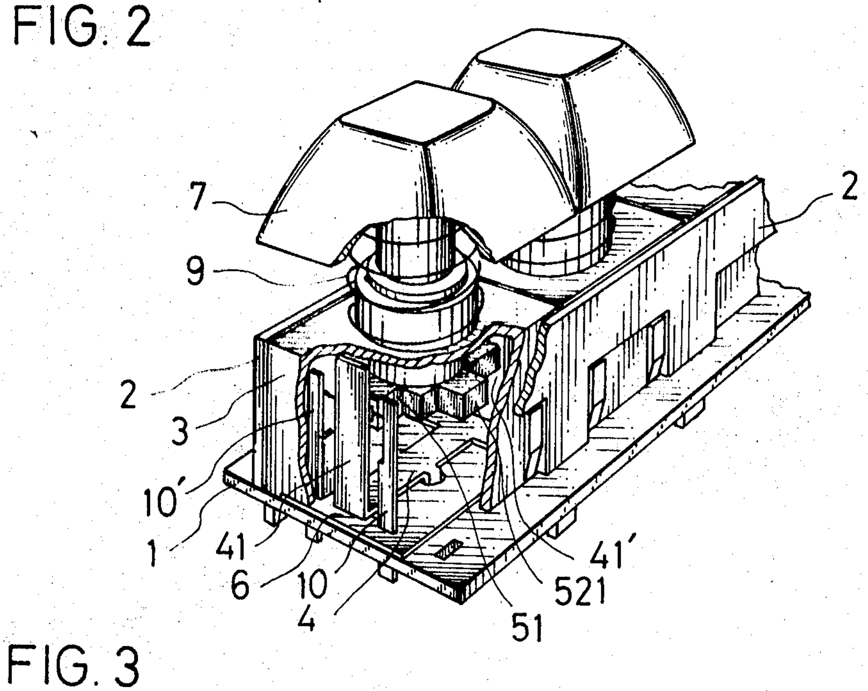
FIG. 2 is an isometric cutaway view of the entire construction of the apparatus according to the present invention.

Referring to FIG. 2, there is shown the entire construction of the apparatus according to the present invention.

Switch cases 3 are held at the positions corresponding to the unit portions between two holding members 2 and bases 6 made of a non-magnetic material are arranged for respective switches between switches cases 3 and base plate 1.

Figure 3:
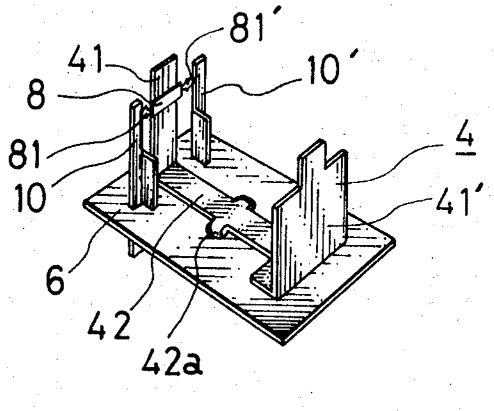
FIGS. 3 to 5 are respectively an isometric view showing an embodiment of the fixed yoke and terminal pin.

U-shaped fixed yoke 4 made of a magnetic material is mounted on base 6 as shown in FIG. 3 with its free-ended segments 41 and 41' face upward and a pair of terminal pins 10 and 10' made of a conductive material are planted in both sides near one free-ended segment 41.

These fixed yoke and terminal pins are contained in switch cases 3.

Fixed yoke 4 and terminal pins 10 and 10' can be fixed by any desired method; as shown in FIG. 3, a pair of pin portions 42*a* which are projected downwardly from center coupling part 42 of fixed yoke 4 may be provided on fixed yoke 4, said pin portions each may be passed through base 6 and base plate 1 so that its end is soldered to printed circuit 1*a* and similarly terminal pins 10 and 10' may be passed through base 6 and base plate 1 to be soldered to printed circuit 1*a*.

Figure 4:
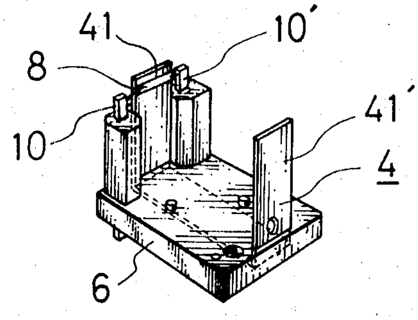

Or, as shown in FIG. 4, fixed yoke 4 and terminal pins 10 and 10' may be planted in base 1 by molding, the lower ends of terminal pins 10 and 10' may be projected to pass through base plate 1 and soldered to printed circuit 1a. In this case, the upper ends of terminal pins 10 and 10' should be exposed and the opposed surfaces of both free-ended segments 41 and 41' of fixed yoke 4 should be exposed.

A semiconductor element, that is, magnetro-resistance effect device 8 having resistance varying with a magnetic field intensity applied is fixed at a side opposed to other free-ended segment 41' of one free-ended segment 41 of U-shaped yoke 4. Leads 81, 81' of magnetro-resistance effect device 8 are connected to terminal pins 10 and 10'.

Figure 5:
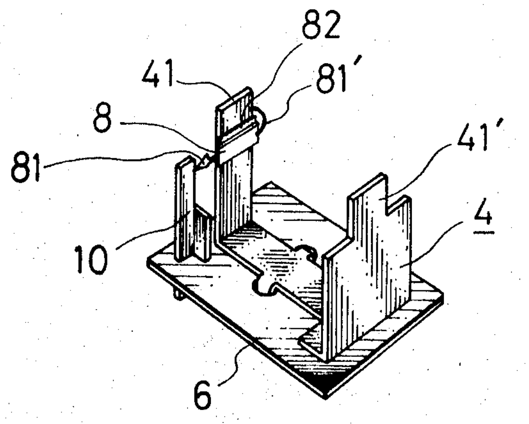

If fixed yoke 4 is made of a highly conductive material, it can be employed as a terminal pin. As shown in FIG. 5, terminal pin 10 may be provided near free-ended segment 41 on which device 8 is fixed, of both free-ended segments of fixed yoke 4, and one of a pair of leads of device 8 may be connected to terminal pin 41 and the other to free-ended segment 41 of fixed yoke 4. In this case, device 8 should be insulated by insulating material 82 from free-ended segment 41 of fixed yoke 4.

Figure 6A:
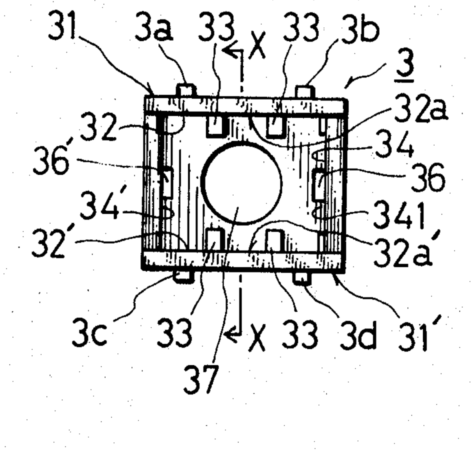
FIGS. 6*a* and 6*b* show the switch case.
Figure 6B:
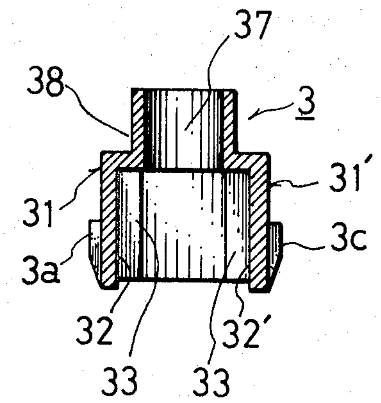

Referring to FIGS. 6a and 6b, there is shown switch case 3.

Switch case 3 is formed in a square cylinder. A pair of externally projected engaging parts 3a and 3b and that of said engaging parts 3c and 3d projecting outwardly are respectively provided on external walls 31 and 31' which are parallel each other and engage with recessed openings 2a of holding member 2, thus being fixed to base member 1. Two pairs of guide plates 33 are respectively provided in parallel arrangement with a specified interval along the vertical direction on opposed inside walls 32 and 32' of switch case 3 to form opposed guideways 32a and 32a', grooves 341 with which free-ended segments 41' of fixed yoke 4 engage are vertically provided at one inside wall 34 of inside walls 34 and 34' between inside walls 32 and 32' and through holes 36 and 36' with which the free-ended segments of fixed yoke 4 engage are provided at the portion of upper wall 35 which contacts inside walls 34 and 34'.

Through hole 37 is provided at upper wall 35 of switch case 3 so as to vertically pass through the center of said upper wall and cylinder 38 extending outwardly from the through hole portion.

Such switch case 3 contains fixed yoke 4 and terminal pins 10 and 10' and covers base 6 as described in the foregoing.

Figure 7:
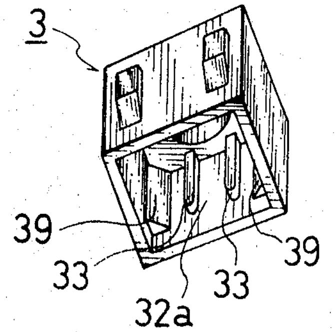
FIG. 7 is another embodiment of the switch case.

As shown in FIG. 2, base 6 may be covered by the switch case so that the lower end of switch case 3 is mounted onto the peripheral surface of base 6 or so that base 6 is fitted inside the lower end of switch case 3. In the latter case, it is desirable to provide extended portions 39 at the inside corners of switch case 3 as shown in FIG. 7 so that these extended portions are supported by the corners of the base.

Figure 8:
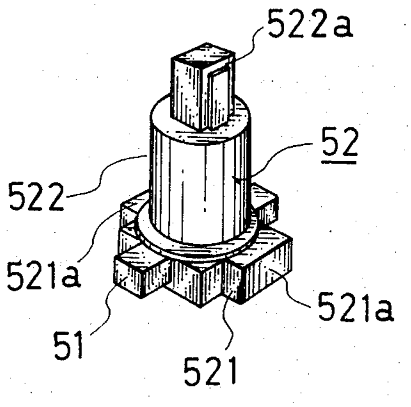
FIG. 8 is an isometric view of the magnet and support member.
Figure 9A:
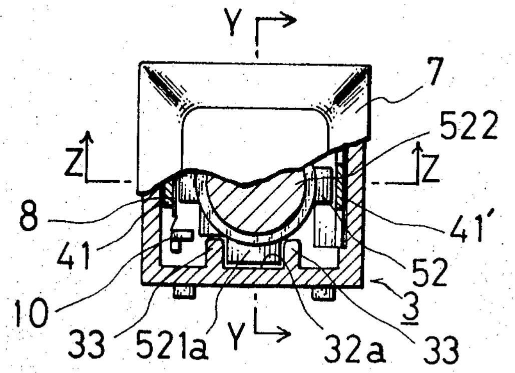
FIGS. 9*a* to 9*c* are assembly views of the apparatus according to the present invention.
Figure 9B:
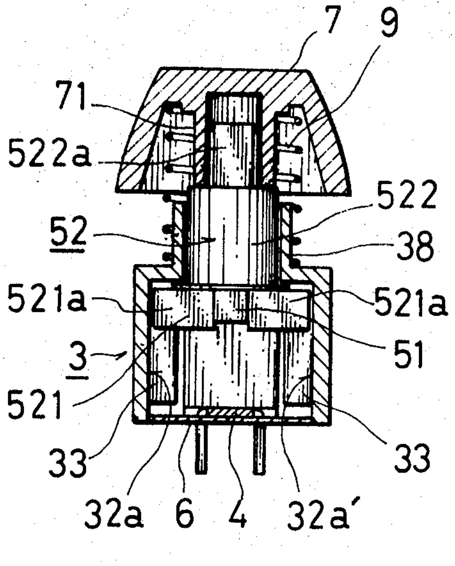
Figure 9C:
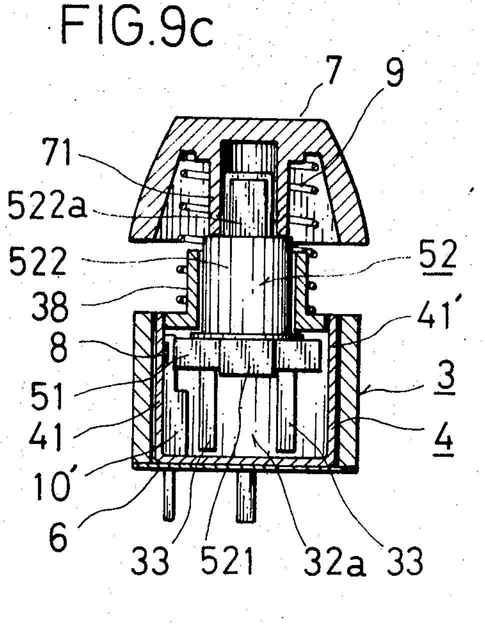

Referring to FIG. 8, there are shown magnet 51 which applies the magnet field to magnetro-resistance effect device and support member 52 made of a non-magnetic material which supports and elevates the magnet.

Support member 52 is formed in the reversed T shape and is comprised of square rod type supporting part 521 which is held horizontally and round rod type coupling part 522 which is joined integral with the square rod type supporting part at a right angle.

Square bar type magnet 51 is passed through at a right angle to square rod type supporting part 521.

This supporting part 521 is fitted between guideways 32a and 32a' so that both ends 521a of supporting part 521 are guided by the guide plates of switch case 3 and freely slid in the vertical direction. On the other hand, coupling part 522 slides cylinder 38 of switch case 3 in a vertical direction.

Key top 7 is mounted on the upper end of coupling part 522 outside switch case 3. Describing in detail, top end 522a of coupling part 522 is formed in a thinner square bar shape, a fitting hole is provided at the end of center bar 71 which projects downwardly from the inside center of key top 7 and top end 522a is fitted into said fitting hole to couple key top 7 to said coupling part.

Coil spring 9 is provided between key top 7 and switch case 3 so as to surround cylinder 38 of switch case and center bar 71 of key top 7.

Spring 9 is provided to give a resilient returning force to key top 7 when the key top is depressed by a finger.

When key top 7 is depressed, coupling part 522 of support member 52 slides cylinder 38 of switch case 3 and supporting part 521 of support member 52 slides along guideways of switch case 3 whereby magnet 51 lowers while opposing to both free-ended segments 41 and 41' of fixed yoke 4.

Figure 10:
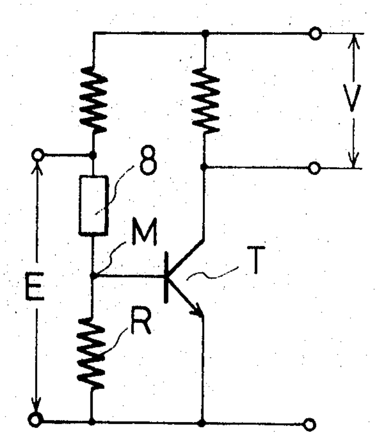
FIG. 10 is an example of the switching circuit.

In this movement, a magnetic path is always formed between magnet 51 and free-ended segments 41 and 41' of fixed yoke 4. Accordingly, for example, if magnet 51 is usually positioned to oppose to magnetro-resistance effect device 8, the magnetic flux is usually applied to device 8 and therefore the device shows a high resistance value; however, since the magnetic flux is not applied to device 8 when key top 7 is depressed, the resistance value of device 8 suddenly decreases. As shown in FIG. 10, therefore, fixed resistor R is series-connected to device 8 in the external circuit, specified voltage E is applied to this series circuit, and voltage V at intermediate point M between device 8 and resistor R is suddenly changed by depression of the key top. Accordingly, this voltage is applied as the base bias voltage of transistor T and the switching by the transistor can be performed.

Figure 11:
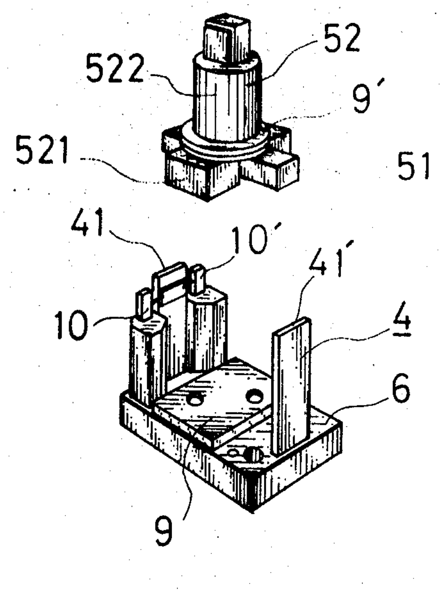
FIG. 11 is an isometric view showing an embodiment of the apparatus, principal parts being disassembled.

Referring to FIG. 11, there is shown another embodiment of the apparatus according to the present invention.

Plate type shock absorbing member 9 made of a non-magnetic elastic material such as, for example, rubber is mounted on the upper surface of base 6 while annular shock absorbing member 9' made of a similar material is mounted between coupling part 522 and supporting part 521 of support member 52.

If the shock absorbing members are provided, they can absorb shock occurring when support member 52 hits base 6 or fixed yoke 4 when moving yoke 5 is lowered by depressing key top 7 and that occurring when support member hits the upper surface of switch case 3 when key top 7 is released and support member lifts.

In this embodiment, magnet 51 is designed to fit into supporting part 521 of support member 52 from the lower side.

Figure 12:
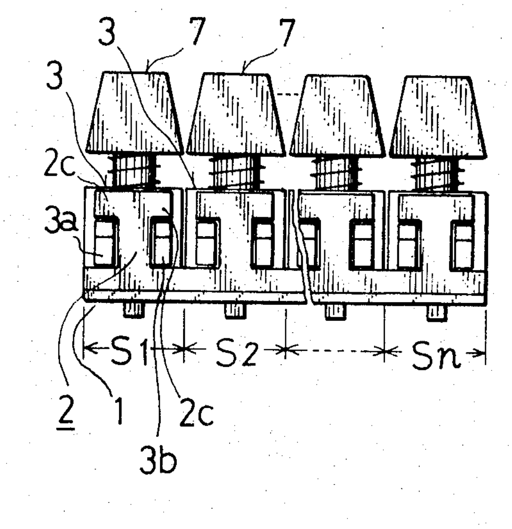
FIG. 12 is a front view showing an embodiment of the apparatus according to the present invention.

Referring to FIG. 12, there is shown another embodiment of holding member 2.

Holding members 2 are constructed to form a T-shaped plate in unit portions $S_1$, $S_2$, - - - - , $S_n$, respectively so that engaging parts 3a, 3b, 3c and 3d of switch case 3 engage with the lower sides of both wing ends 2c of the T-shaped plates.

Figure 13:
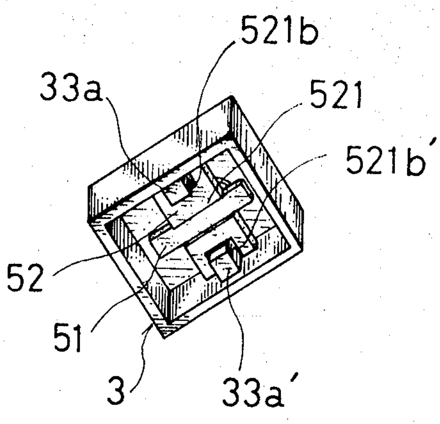
FIG. 13 is an isometric view of an embodiment of the magnet and support member.

The mechanism in which support member 52 is guided along the guideways can be formed in a different construction. In other words, as shown in FIG. 13, said mechanism can be constructed so that grooved portions 521b and 521b' are provided vertically on both end surfaces of supporting part 521, guideways 32a and 32a' comprise guide rails 33a and 33a' positioned between said grooved portions and support member 52 is lifted and lowered while grooved portions 521*b* and 521*b'* are guided by guide rails 33*a* and 33*a'*.

The apparatus according to the present invention is constructed as described and provides the following effects.

For example, a keyboard on which many switches are arranged can be made easily and economically because the construction of the switching apparatus is simple.

Since the apparatus is constructed so that a resilient force of a spring is applied to the key top, uniform resilient force can be applied to many switches.

Since the guideways are provided on the apparatus, the elevating position of the magnet is accurately maintained and the magnetic force applied to the magnetro-resistance effect device is kept constant, thus causing the output to be fixed.

What is claimed is:

1. A contactless switching apparatus comprising:

a. a fixed yoke made of a magnetic material which is formed in a U shape so that it has a pair of parallel free-ended segments, b. a base made of a non-magnetic material to which said fixed yoke is secured so that both free-ended segments of the fixed yoke face upward, c. at least one magnetro-resistance effect device which is mounted on a side opposing to the other free-ended segment of one of the free-ended segments of said fixed yoke, d. at least one terminal pin made of a conductive material which is arranged near the free-ended segment at which said magnetro-resistance effect device is fixed, is fixed to the base under which its lower end is projected and is connected with a lead of said magnetro-resistance effect device, e. a magnet which is arranged between said both free-ended segments so that both magnetic poles are positioned to respectively oppose to said both free-ended segments of the fixed yoke and a magnetic path is formed between said free-ended segments and the magnet, f. a support member which supports said magnet and can be vertically slid, g. a switch case which is open at its lower side to cover said base, houses said fixed yoke, terminal pins and magnet, and is provided with a through hole at its upper surface through which said support member slides in a vertical direction and guide-ways being located inside said switch case to guide said support member in a vertical direction, h. a key top which is mounted on the upper part of said switch case, coupled to the upper end of the support member and is constructed so that it can be lowered by manual depression and, i. a spring member which provides resilient force to return said key top to the home position.

2. An apparatus according to claim 1, wherein said support member comprises a supporting part which is made in the form of bar and fixes said magnet so that the supporting part intersects at a right angle to the direction between both magnetic poles of said magnet and a rod type coupling part passing through said through hole,

3. An apparatus according to claim 2, wherein said guideways are constructed so that two groups of guide plates, each of two groups containing a pair of vertically arranged parallel guide plates, are opposed and both ends of said support member are guided in each group of guide plates.

4. An apparatus according to claim 2, wherein grooves are provided in a vertical direction on both end faces of the supporting parts of said support member.

5. An apparatus according to claim 4, wherein said guideways comprises a pair of opposed guide rails provided in a vertical direction and the guide rails are respectively fitted into said grooves.

6. An apparatus according to claim 1, wherein said fixed yoke and said terminal pins are planted in said base so that upper ends of said terminal pins and opposing faces of the free-ended segments of the fixed yoke are exposed.

7. An apparatus according to claim 1, wherein said resilient member comprises a coil spring provided between said key top and the upper surface of said switch case.

8. An apparatus according to claim 1, wherein said fixed yoke is made of a highly conductive material, one terminal pin is provided, one of lead wires from both ends of said magnetro-resistance effect device is connected to said fixed yoke and the other lead wire is connected to said terminal pin.

9. An apparatus according to claim 1, wherein a shock absorbing member made of an elastic material is provided between said support member and base.

10. An apparatus according to claim 1, wherein a shock absorbing member made of an elastic material is provided between said support member and the inner upper wall of the switch case.

11. An apparatus according to claim 1, wherein the apparatus is further provided with a base plate one surface of which being provided with a printed circuit and a pair of parallel holding members being vertically planted on the base plate with the specified interval, said holding members are extended with at least one unit portion of the same shape in sequence in the lengthwise direction and said switch case is held by said holding member in said unit portion.

12. An apparatus according to claim 11, wherein said switch case is formed as a square cylinder.

13. An apparatus according to claim 12, wherein said switch case is provided with at least one externally projected engaging part on a pair of parallel side walls and said externally projected engaging part is engaged with the unit portion of said holding members.

* * * * *